United States Patent [19]
McLeod et al.

[11] Patent Number: 6,020,985
[45] Date of Patent: Feb. 1, 2000

[54] MULTILAYER REFLECTION MICROHOLOGRAM STORAGE IN TAPE MEDIA

[75] Inventors: Robert R. McLeod, Morgan Hill; Sergei L. Sochava, Sunnyvale; Andrew J. Daiber, Palo Alto; Mark E. McDonald, Mountain View; Lambertus Hesselink, Atherton; Ingolf Sander, Cupertino; Timothy M. Slagle, Mountain View, all of Calif.

[73] Assignee: Siros Technologies, Inc., San Jose, Calif.

[21] Appl. No.: 09/191,314

[22] Filed: Nov. 13, 1998

Related U.S. Application Data

[63] Continuation-in-part of application No. 09/016,213, Jan. 30, 1998.

[51] Int. Cl.[7] ................................ G03H 1/26; G11B 7/00
[52] U.S. Cl. .................................. 359/22; 359/3; 359/35; 369/103; 369/109; 369/122; 369/112; 369/44.23
[58] Field of Search .................................. 359/22, 24, 25, 359/3, 4, 7, 1, 35; 369/103, 109, 122, 112, 44.23; 365/125, 234, 235

[56] References Cited

U.S. PATENT DOCUMENTS

| | | | |
|---|---|---|---|
| 3,618,049 | 11/1971 | Amodei et al. | 340/173 |
| 3,720,921 | 3/1973 | Schools et al. | 340/173 |
| 3,947,640 | 3/1976 | Ruell et al. | 179/100.3 B |

(List continued on next page.)

FOREIGN PATENT DOCUMENTS

| | | | |
|---|---|---|---|
| 4208328 | 3/1992 | Germany | G11B 7/00 |
| 1954501 | 9/1995 | Germany | G11B 7/007 |

OTHER PUBLICATIONS

Glezer et al., Three–dimensional optical storage inside transparent, Op. Soc. of Am., vol. 21, No. 24, Dec. 1996.

Homan, S., High capacity optical storage using multiple wavelengths, multiple layers and volume holograms, Elec. Letters, 31(8), pp. 621–623, Apr. 1995.

Eichler, H., High density disc storage by multiplexed microholograms, SPIE, vol. 3109, pp. 239–244, Apr. 1997.

Fleisher, H. et al., An optically assessed memory using the lippmann process for information storage, Op. Elec. Info. Proc., Chap. 1, pp. 11–40, MIT Press 1965.

Parthenopoulac et al., Three–dimensional optical storage memory, Science, vol. 245, pp. 843–845, Aug. 1989.

Kawata, Y. et al., Three–dimensional optical memory with a photorefractive crystal, Appl. Opt. (34) 20, pp. 4105–4110, Jul. 1995.

Kawata, Y. et al., Randomly accessible multilayers optical memory with a Bi12SiO20 crystal Appl. Opt., (35) 26, pp. 5308–5311, Sep. 1996.

(List continued on next page.)

*Primary Examiner*—Jon Henry
*Attorney, Agent, or Firm*—Lumen Intellectual Property Services

[57] ABSTRACT

Digital data bits are stored as discrete-level reflection microholograms in a multi-depth digital optical data storage system. Reference and signal beams are incident in a counterpropagating geometry on opposite faces of a tape. The reflection microholograms are stored at the coinciding focus of the reference and signal beams. The holograms are stored at the diffraction limit of high-N.A. optics, and have relatively high grating frequencies and small sizes. Dynamic aberration compensators correct for the depth-varying spherical aberration imparted to the beams by the medium. Multiple mutually-incoherent lasers are used for parallel storage and retrieval to increase data transfer rates. Achievable densities and signal-to-noise ratios are substantially higher than for index-perturbation or transmission hologram storage methods.

7 Claims, 3 Drawing Sheets

U.S. PATENT DOCUMENTS

| | | | |
|---|---|---|---|
| 4,024,513 | 5/1977 | Huignard et al. | 340/173 |
| 4,045,115 | 8/1977 | Lee | 350/3.5 |
| 4,135,251 | 1/1979 | Ruell | 365/216 |
| 4,138,189 | 2/1979 | Huignard et al. | 350/3.64 |
| 4,183,094 | 1/1980 | Keezer et al. | 365/127 |
| 4,458,345 | 7/1984 | Bjorklund et al. | 369/103 |
| 4,920,220 | 4/1990 | Phaff | 544/90 |
| 5,191,574 | 3/1993 | Henshaw et al. | 369/100 |
| 5,202,875 | 4/1993 | Rosen et al. | 369/94 |
| 5,243,589 | 9/1993 | Stuke et al. | 369/100 |
| 5,283,777 | 2/1994 | Tanno et al. | 369/108 |
| 5,289,407 | 2/1994 | Strickler et al. | 365/106 |
| 5,331,445 | 7/1994 | Dickson et al. | 359/15 |
| 5,422,873 | 6/1995 | Kewitsch et al. | 369/103 |
| 5,440,669 | 8/1995 | Rakuljik et al. | 359/7 |
| 5,450,218 | 9/1995 | Heanue et al. | 359/21 |
| 5,479,394 | 12/1995 | Yashima et al. | 369/275.1 |
| 5,519,517 | 5/1996 | Redfield et al. | 359/22 |
| 5,636,190 | 6/1997 | Choi | 369/44.23 |
| 5,659,536 | 8/1997 | Maillot et al. | 369/275.1 |
| 5,759,721 | 6/1998 | Dhal et al. | 430/1 |
| 5,761,111 | 6/1998 | Glezer | 365/106 |
| 5,786,117 | 7/1998 | Hoshi et al. | 430/21 |

OTHER PUBLICATIONS

Eichler, H. et al., Multiplexed holograms for the microholographic storage disc, Conference Proceedings for Optical Data Storage '98, pp. 77–79, May 10, 1998.

Eichler, H. et al., Holographic recording of microscopic Bragg–reflectors for optical data storage, Conference Proceedings for Optical Data Storage '98, pp. 159–161, May 10, 1998.

Diez, S., High density disc storage by multiplexed microholograms, Optical Institute of Tech. Univ. of Berlin, Strasse des 17, Juni 135, 10623 Berlin Germany, CLEO Apr. 1997, pp. 258–259.

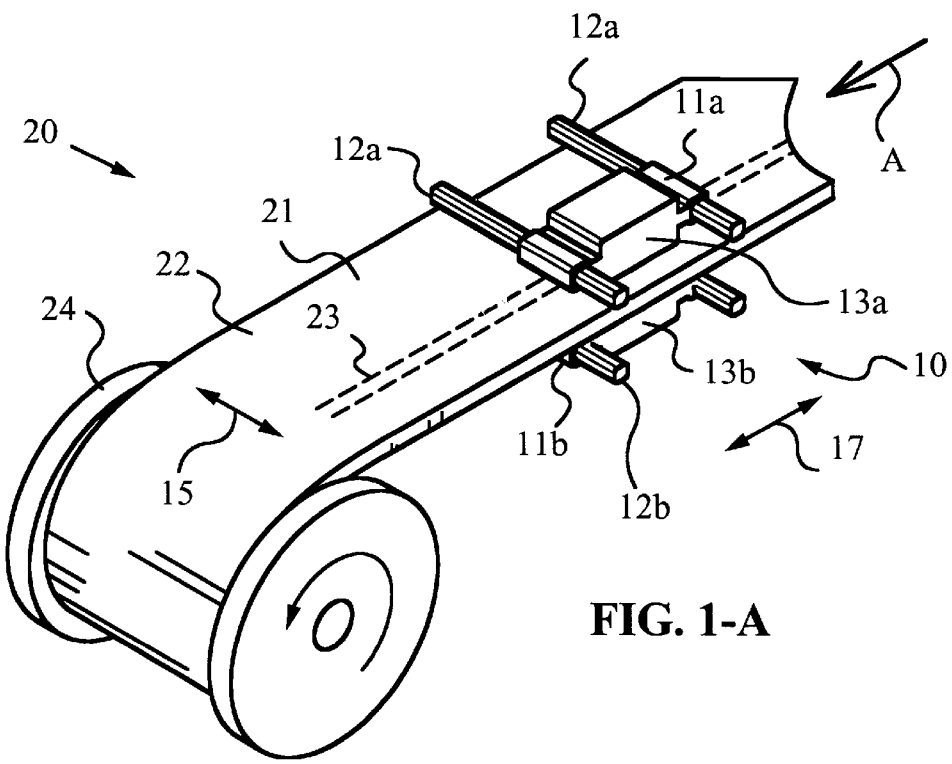
FIG. 1-A
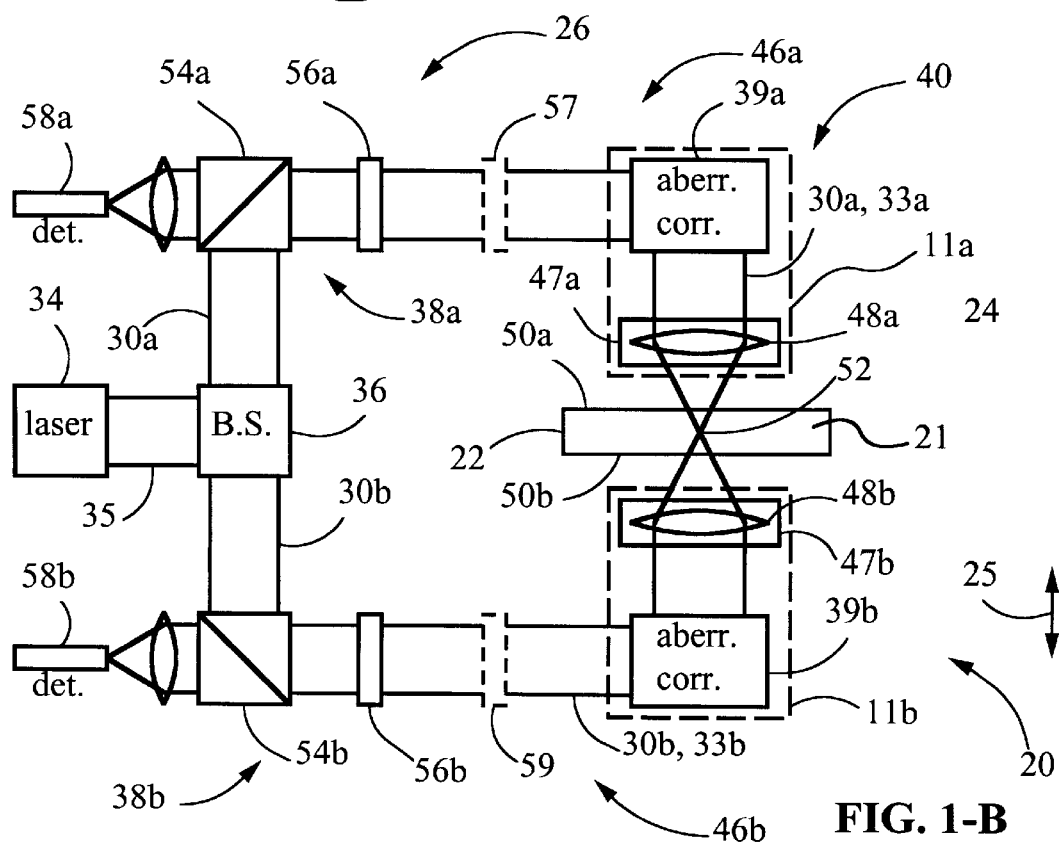
FIG. 1-B

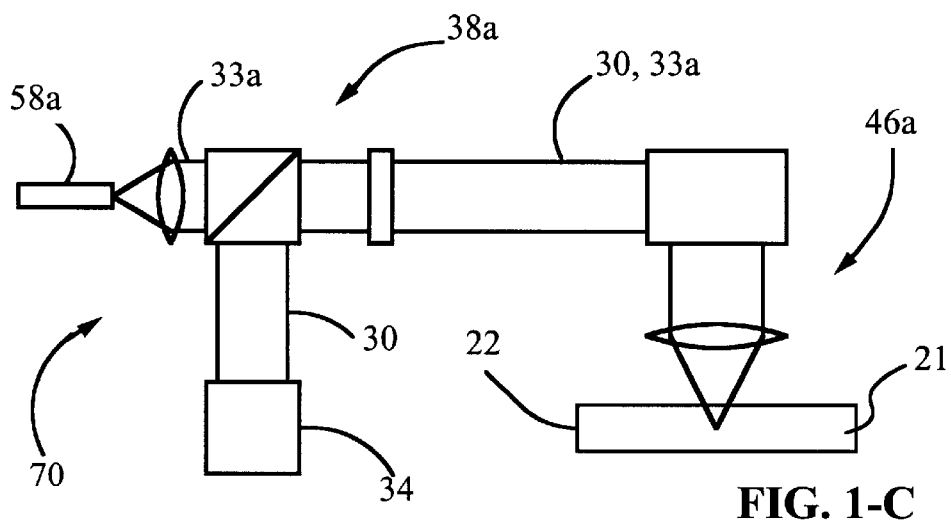
FIG. 1-C
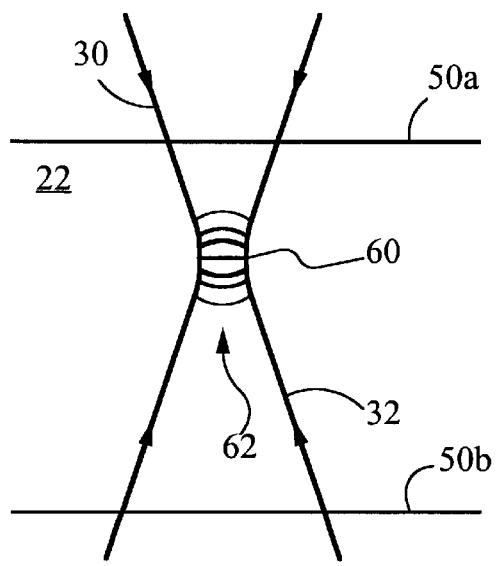
FIG. 2-A
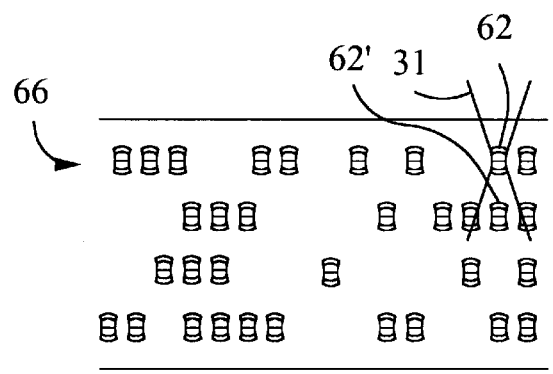
FIG. 2-B

MULTILAYER REFLECTION MICROHOLOGRAM STORAGE IN TAPE MEDIA

RELATED APPLICATIONS

This invention is a continuation-in-part of patent application Ser. No. 09/016,213 filed on Jan. 30, 1998.

FIELD OF THE INVENTION

The present invention relates to the field of holographic data storage, and in particular to a system and method for storing digital data as reflection microholograms in a holographic tape.

BACKGROUND OF THE INVENTION

In holographic storage, data is stored in a hologram resulting from the interference of a signal and reference beam. During storage, both the reference and signal beams are incident on the storage medium. During retrieval, only the reference beam is incident on the medium. The reference beam interacts with the stored hologram, generating a reconstructed signal beam proportional to the original signal beam used to store the hologram. Relative to conventional magnetic and optical data storage methods, holographic data storage promises high storage densities, short access times, and fast data transfer rates. The widespread use of holographic data storage has been hindered by the relative complexity of the specialized components required for storage and retrieval of data.

For information on conventional volume holographic storage see for example U.S. Pat. Nos. 4,920,220, 5,450,218, and 5,440,669. In conventional volume holographic storage, each bit is stored as a hologram extending over the entire volume of the storage medium. Multiple bits are encoded and decoded together in pages, or two-dimensional arrays of bits. Multiple pages are stored within the volume by angular, wavelength, phase-code, or related multiplexing techniques. Each page can be independently retrieved using its corresponding reference beam. The parallel nature of the storage approach allows high transfer rates and short access times, since as many as $10^6$ bits within one page can be stored and retrieved simultaneously. Conventional volume holographic storage generally requires complex, specialized components such as amplitude and/or phase spatial light modulators, however.

In U.S. Pat. No. 4,458,345, Bjorklund et al. describe a bit-wise volume holographic storage method using signal and reference beams incident on a rotating disk in a transmission geometry. The signal and reference beams are incident from the same side of the disk. The angle between the reference and signal beams can be altered to store holograms at various depths within the medium. A separate photodetector is used to retrieve data stored at each depth. The interaction of light with the medium is localized through two-photon recording.

In U.S. Pat. No. 5,659,536, Maillot et al. describe a system in which multiple holograms are stored at each location in a disk through wavelength multiplexing. Each hologram spans the depth of the medium. In U.S. Pat. No. 5,289,407, Strickler et al. describe a multi-layered, non-holographic, index-perturbation optical storage system. Bits are stored as localized perturbations in the index of refraction of a photopolymer, caused by the high intensity at the focus of a single laser beam.

Holographic recording of data on a tape medium is also described. Examples are found in U.S. Pat. No. 5,519,517 by Redfield et al., U.S. Pat. No. 4,135,251 by Ruell, U.S. Pat. No. 4,045,115 by Lee and U.S. Pat. No. 3,947,640 by Ruell et al.

SUMMARY OF THE INVENTION

Briefly, and in general terms, the present invention provides a bit-wise holographic data storage and/or retrieval system and method having improved storage density, and in which the optical components used for storage and retrieval can be relatively simple and inexpensive. With the present invention, bits are stored in a relatively small volume, and in particular over a small depth, as reflection microholograms. Multiple microholograms are stored at a plurality of depth locations, thereby allowing the storage of multiple data layers in a holographic storage tape.

Microhologram storage is accomplished by use of a tunable-focus optical system which focuses a reference beam and a signal beam at a plurality of selected storage locations within the holographic medium. Coincidentally focused reference and signal beams are used in a counter-propagating geometry to record holograms at a plurality of depths. Microhologram retrieval is accomplished by selectively focusing a reference beam on various microholograms recorded at a plurality of depths within the medium, and by capturing the signal beams reflected by the microholograms with an optical detector. By using a tunable-focus reference beam and a counterpropagating beam geometry, a single detector can be used for retrieving data stored as microholograms at a plurality of depths within the tape.

High-numerical-aperture (N.A.) writing and readout heads can be used to enhance the depth localization of the microholograms. Dynamic aberration-correction optics allow the use of the high-N.A. heads over relatively large depths.

In one embodiment, the holographic digital data storage system has holographic storage tape made of a holographic medium, a light source for generating a signal beam and a reference beam, and a tunable-focus storage head system in optical communication with the light source. The head system consists of a tunable-focus reference head for focusing the reference beam at storage locations at a plurality of depths within the medium, and a tunable-focus signal head for focusing the signal beam at the same storage locations. Preferably, the signal and reference heads are mounted on positioning actuators on opposite sides or surfaces of the tape. The positioning actuators can be mounted on an actuating mechanism which interlocks them to ensure that the reference beam and signal beam are coincidentally focused. At each storage location, the reference and signal beams are counterpropagating. Digital data is stored as reflection microholograms (or microlocalized holographic gratings) resulting from the interference of the signal and reference beams at their foci.

More generally, data can be stored as micro-localized variations in the complex (i.e. real and/or imaginary) index of refraction characterizing reflection holograms. The variations can be represented as complex functions, which functions may be further characterized by a phase. Suitable holograms may include, by way of example and not necessarily by way of limitation: microlocalized variations in the real component of the index of refraction, or microlocalized variations in the amplitude of the index of refraction. Such holograms may also represent data in their relative phases.

A tape-based retrieval system according to the invention has a light source, a tunable-focus retrieval head system in optical communication with the light source and aimed at a surface of the tape, and an optical detector in optical communication with the retrieval head. Preferably, the retrieval head is mounted on a positioning actuator mounted over the surface of the tape. The retrieval head system focuses an input reference beam on reflection microholograms at a plurality of depths stored in the tape, and captures a reconstructed output signal beam reflected by the holograms. The detector detects the signal beam, for retrieving digital data stored as the holograms. In the preferred embodiment, the retrieval system comprises a single retrieval head.

The storage medium of which the tape is made is preferably a homogeneous photopolymer layer.

Dynamic aberration compensators are preferably situated in the optical paths between the light source and the retrieval and/or reference/signal storage heads, for compensating for the depth dependence of the spherical aberrations introduced in the signal and reference beams by the holographic medium.

In an alternative embodiment, the light source comprises a plurality of mutually incoherent lasers for generating corresponding signal and reference beams. The lasers are arranged so as to be imaged onto the medium along a radial line such that each of the lasers illuminates a different data track on the tape.

Other features and advantages of the invention will become apparent from the following detailed description, taken in conjunction with the accompanying drawings.

DESCRIPTION OF THE FIGURES

FIG. 1-A shows an isometric view of a multi-layer reflection microhologram storage system of the present invention.

FIG. 1-B shows a schematic view of the optical components of a storage system of the present invention.

FIG. 1-C shows a side schematic view of the optical components of a preferred retrieval system of the present invention.

FIG. 2-A shows an enlarged schematic side view of a reflection microhologram stored at the focus of counter-propagating beams incident from opposite surfaces of a holographic storage tape.

FIG. 2-B is an enlarged cross-sectional view of the tape illustrating a typical arrangement of multiple microhologram layers.

DETAILED DESCRIPTION

Figure 3:
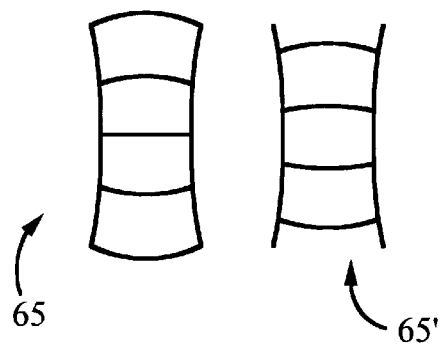
FIG. 3 schematically illustrates two adjacent reflection microholograms having opposite phases.

FIG. 1-A shows an isometric view of a multi-depth reflection microhologram storage/retrieval system 20 of the present invention. System 20 is designed for storage, but can also be used for retrieval. A holographic storage tape 21 comprises a holographic medium 22 as well as packaging elements (not shown) for mechanically protecting medium 22 and for mounting tape 21 on a roll-system 24 for advancing tape 21 in the direction indicated by arrow A (for reasons of clarity only one roll 24 is shown). Roll 24 is controlled by a drive mechanism (not shown) which rotates roll 24 and any other rolls belonging to the system.

Medium 22 is formed of a structurally homogeneous layer of a photopolymer having a thickness preferably on the order of hundreds of $\mu$m, for example about 100–200 $\mu$m or less. The photopolymer is situated between two layers of flexible material that transmits light at the operating wavelength. For information on photopolymers see for example Lessard and Manivannan (ed.), *Selected Papers on Photopolymers*, SPIE Milestone Series, v. MS-114, SPIE Optical Engineering Press, Bellingham, Wash., 1995. Multiple layers (preferably >5) of concentric data tracks 23 are stacked along the depth of medium 22. Adjacent data tracks at one depth are separated along a transverse direction 15, while microholograms along a data track are separated along a longitudinal direction 17.

A head assembly 10 is used to access microholograms at storage locations within medium 22. Head assembly 10 and roll 24 are preferably connected to a fixed housing (not shown). Head assembly 10 comprises carriage assemblies 11a–b, which are movably mounted on fixed, mutually parallel rails 12a–b, respectively. Carriage assemblies 11a–b are capable of linear motion along rails 12a–b along transverse direction 15 relative to tape 21. Carriage assemblies 11a–b each comprise voice coil actuators for controlling their coarse tracking positioning along rails 12a–b, with respect to medium 22. Carriage assemblies 11a–b face opposite (top and bottom) sides of medium 22. Carriage assemblies 11a–b comprise respectively the movable parts of optical heads 46a–b, as illustrated in FIG. 1-B. Faces 13a–b of carriage assemblies 11a–b provide for optical communication between the optical components mounted on carriage assemblies 11a-b and fixed optical components mounted outside carriage assemblies 11a–b. Such fixed components include the fixed parts of optical heads 46a–b and a light source 34.

FIG. 1-B shows a schematic side view of system 20, illustrating its optical components. Optics 26 for generating a reference beam 30a and a signal beam 30b are mechanically fixed with respect to system 24 such that beams 30a–b are positioned to coincidentally access medium 22 in a counterpropagating geometry when tape 21 is properly mounted on roll 24. Optics 26 comprise a number of components in mutual optical communication: a light source 34 and beam splitting components 36 for generating beams 30a–b, and a tunable-focus storage head system 40 for directing and focusing beams 30a–b onto desired storage locations within medium 22.

Light source 34 generates a primary light beam 35 which is split by beam splitting components 36 into reference beam 30a and signal beam 30b. Components 36 are illustrated schematically in FIG. 1-B; suitable beam splitting components are well known in the art. Optics 26 are designed such that the optical path difference between beams 30a, 30b is much less (e.g. <10%, preferably <1%) than the coherence length of light source 34, such that beams 30a, 30b are mutually coherent at their coincident foci. Likewise, the coherence length of light source 34 is much larger than the depth over which microholograms are stored.

Head system 40 focuses reference beam 30a and signal beam 30b coincidentally at storage locations at a plurality of depths within medium 22. Head system 40 comprises tunable-focus reference and signal heads 46a–b. Heads 46a–b are situated on opposite sides of tape 21, facing opposite planar input surfaces 50a–b of medium 22. Reference head 46a focuses reference beam 30a at a storage location 52 within medium 22, while signal head 48b focuses signal beam 30b at storage location 52.

Heads 46a–b comprise respectively high numerical aperture (N.A.) objective lenses 48a–b facing tape 21, dynamic aberration compensators 39a–b in the light path between light source 34 and objective lenses 48a–b, optical detectors 58a–b, and beam separation components 38a–b for directing beams 30a–b toward medium 22 while directing light traveling from medium 22 toward detectors 58a–b, respectively.

Each of objective lenses 48a–b typically has a N.A. higher than 0.25, preferably higher than about 0.4, and more preferably about 0.5. High numerical apertures are desirable since they allow relatively short depths of field, and consequently relatively close interhologram spacings along the depth of the medium. High numerical apertures also allow relatively small spot sizes for stored holograms. Increasing numerical apertures above about 0.5 or 0.6 may lead to substantially increased complexity in the optics required for storage and retrieval, and to relatively stringent tolerances on mechanical components.

Lenses 48a–b are mounted on dual-axis actuators 47a–b respectively, which dynamically control the focusing and fine-tracking positions of lenses 48a–b relative to medium 22. The focusing actuators control the vertical (in-depth) motion of lenses 48a–b relative to tape 21, both coarsely for accessing different depth layers and finely for maintaining lenses 48a–b focused on a desired depth layer. Coarse and fine tracking positioning is performed along the transverse direction 15 of tape 21, i.e. across tracks 23. At least one of lenses 48a–b is further mounted on a track-position actuator. The track-position actuator controls the relative positions of lenses 48a–b along a track direction (perpendicular to the fine-tracking and focusing directions) to ensure that beams 30a–b are aligned along the track and are coincidentally focused.

Heads 46a–b are preferably in a master-slave relationship. For example, if head 46a is the master head, it focuses beam 30a on a desired storage location. Control electronics receive position information from head 46a, and drive head 48b (the slave head) to follow head 46a, such that beam 30b is focused coincidentally with beam 30a. Master-slave connections and associated electronics are generally well known for electromechanical devices. In general, both heads 46a–b can be independent master heads for at least some alignment axes, and can be used to coincidentally focus beams 30a–b independently.

Dynamic aberration compensators 39a–b dynamically compensate for the variable spherical aberration introduced in beams 30a, 30b by medium 22. The spherical aberration in each beam depends on the depth accessed by the beam. Aberration compensators are generally well known. Various dynamic aberration compensators have been described for conventional pit-based storage, for example in U.S. Pat. No. 5,202,875 (Rosen et al). While aberration compensators 39a–b are shown for clarity as separate from objective lenses 48a–b and focusing actuators 47a–b, aberration compensators 39a–b may be integrated with lenses 48a–b. Dynamic spherical aberration compensator may also be situated between the lenses and the tape. For details about spherical aberration compensation refer to U.S. Pat. No. 5,202,875 to Rosen et al. and to U.S. patent application Ser. No. 09/109,111 entitled "Spherical Aberration Correction Using Flying Head Lens and Method" by Mark E. McDonald and Yu Chuan Lee, filed Jul. 2, 1998.

Preferably, system 20 uses a pure-amplitude modulation scheme. For a system using phase or phase-and-amplitude modulation, a phase shifter 57 in an optical path between light source 34 and medium 22 can be used to introduce a phase delay into beam 30a and thus vary the relative phase relationships of beams 30a, 30b. Phase-shifter 57 is then dynamically controllable and capable of introducing desired phase delays for individual microholograms. An electro-optic modulator is a particularly useful phase shifter. Other potentially suitable phase shifters include piezo-electric mirrors or other well known devices.

The system of FIG. 1-B can be used for retrieval, with at least one of beams 30a and 30b turned on. During retrieval, both beams 30a–b can act as reference beams. Accessing a stored reflection microhologram with beam 30a generates a reflected, reconstructed output signal beam 33a. Beams 30a and 33a are counterpropagating. Similarly, accessing data with beam 30b results in a reflected, reconstructed output signal beam 33b counterpropagating with beam 30b. Beam separation components 38a–b are used to separate the counterpropagating beams. Beam separation components 38a–b are conventional. Beam separation components 38a–b comprise polarizing beam splitters (PBS) 54a–b and quarter-wave plates 56a–b situated in the optical paths of reference beam 30a and signal beam 30b respectively, between light source 34 and head system 40. Polarizing beam splitters and quarter wave plates are used instead of simple beam-splitters for reducing losses at the separation elements. A switch 59 in an optical path between light source 34 and medium 22 can be used to shut off beam 30b during data retrieval. Switch 59 can be a mechanical shutter.

Reconstructed output beams 33a–b are incident on confocal, depth-selective optical detectors 58a–b, respectively. Detectors 58a–b comprise spatial filtering optics for allowing detectors 58a–b to selectively access only storage locations at desired depths within medium 22. Spatial filtering optics are well known. The spatial filtering optics preferably include appropriately placed pinholes for selectively allowing only rays reflected from an accessed storage location to be directed to detectors 58a–b. The pinholes block stray light from non-accessed regions of medium 22, which would otherwise be incident on detectors 58a–b.

FIG. 1-C shows a preferred retrieval system 70 of the present invention. System 70 is similar to system 20, but does not require separate heads for the signal and reference beams. A single retrieval head 46a focuses reference beam 30a on reflection microholograms within medium 22, and captures a reconstructed output signal beam 33a resulting from the reflection of reference beam 30a by the holograms. Reconstructed output beam 33a is incident on detector 58a.

FIG. 2-A illustrates a reflection microhologram 62 stored at a coinciding focus 60 of reference beam 30a and signal beam 30b. Preferably, not more than one microhologram is stored at the location of microhologram 62. Hologram 62 has substantially planar fringes at focus 60, parallel to the depth direction of medium 22. The grating frequency of hologram 62 is approximately twice the frequency of beams 30a, 30b within medium 22. The fringes of hologram 62 are parallel only along a small fraction of the total depth of medium 22. Away from focus 60, the fringes of hologram 62 are increasingly curved and weaker. Perfect Bragg-matching a readout reference beam to hologram 62 requires accessing hologram 62 with a light beam identical to reference beam 30a or signal beam 30b. Small deviations from perfect Bragg-matching continue to allow readout of hologram 62 if the accessing beam is sufficiently Bragg-matched to hologram 62. The lack of efficient signal reconstruction in the absence of Bragg-matching allow the storage of holograms at multiple depths.

Since its fringes are substantially parallel to the direction of motion of tape 21, hologram 62 can be stored and/or retrieved while tape 21 is advancing. For a numerical aperture of about 0.5 and wavelength of about 500 nm, hologram 62 has on the order of tens of fringes within the Rayleigh range of a corresponding Bragg-matched reference beam. Hologram 62 is thus relatively tolerant to shrinkage within medium 22, wavelength shifts of light source 34, and phase drifts in light source 34, as compared to holograms containing a larger number of fringes.

Generally, the information of hologram 62 is stored as a micro-localized variation in the complex (i.e. real and/or imaginary) index of refraction within medium 22. Hologram 62 is preferably a phase hologram, i.e. its amplitude characterizes local variations in the real component of the index of refraction of medium 22. Alternatively, hologram 62 may be an absorption hologram, i.e. its amplitude may characterize local variations in absorption properties within medium 22. Hologram 62 stores information in its amplitude and/or phase. The index variation of hologram 62 can be represented as a complex function, characterized by an amplitude and a phase. Holograms 62 preferably have one of a set of discrete (digital) amplitude/phase levels.

Hologram 62 is preferably stored at the diffraction limit of high-N.A. optics. Hologram 62 extends over a depth of less than a few tens of microns (e.g. <30 µm), preferably about 10 µm. The depth of hologram 62 is preferably defined by the Rayleigh range of beams 30a–b. Hologram 62 has a spot (in plane) size of less than a few microns (e.g. <3 µm), preferably about 1 µm×1 µm. A hologram length of 1 µm corresponds to a readout time of tens of ns for a medium speed of tens of m/s. The spot size may limit the minimal intertrack spacing, as well as the data density along a track. Adjacent tracks are preferably spaced by a distance at least on the order of the hologram spot size, preferably at least about 1 µm. Adjacent holograms along a track are also separated by a distance at least on the order of the hologram spot size. As indicated, a reflection hologram occupies a relatively small volume.

FIG. 2-B shows a side sectional view through medium 22 of tape 21, illustrating a typical relative arrangement of microholograms in depth. Multiple planar layers 66 of microholograms are stacked along the depth of medium 22. Adjacent layers are separated by a distance on the order of the hologram depth or depth of focus of the accessing beams, preferably about 10 µm center-to-center. The interlayer spacing may vary in depth.

For simplicity, the combined reference and signal beams used to store reflection microholograms 62, 62' are denoted as light beam 31. Holograms 62, 62' are situated in different (e.g. adjacent) layers. When light beam 31 is focused at the location of hologram 62, the out-of-focus parts of light beam 31 also illuminate the storage location of hologram 62'. The out-of-focus light used for accessing the location of hologram 62, even though of a relatively low intensity, can reduce the dynamic range of index changes and diffraction efficiencies achievable at the storage location of hologram 62'.

The degradation of optical properties at one location due to data storage at other locations within medium 22 can be characterized by the "scheduling loss" of the system. Scheduling losses can limit the number of hologram layers that may be stacked. In an optically linear material, the maximum index change at a location varies inversely with the cumulative intensity of light that has contaminated that location. The diffraction efficiency generally varies as the square of the maximum index change. If N layers are written using identical light intensities, the maximum index change in each layer varies as $1/N$, while the diffraction efficiency of stored data varies as $1/N^2$. Scheduling losses can be reduced by offsetting vertically-adjacent tracks or holograms in the radial direction, such that holograms in adjacent depth layers are not vertically aligned. Scheduling losses can also be reduced through the use of an optically non-linear storage material.

The degradation in the optical properties of the location of hologram 62' due to the storage of hologram 62 may depend on whether hologram 62' is stored before or after hologram 62. Therefore, an optimized storage sequence can be designed to minimize optical response degradation within medium 22. The storage sequence specifies the order of the depths to be accessed during storage.

A system of the present invention can allow a significant improvement in signal-to-noise ratio (SNR), relative to an index-perturbation system using an identical maximal variation in refractive index. The SNR of each system is directly related to the diffraction efficiency of a stored hologram or perturbation. Estimates of diffraction efficiencies for index perturbation and holographic storage methods can be calculated for perturbations and holograms written using plane waves. The mean diffraction efficiency for an index perturbation written with plane waves is approximately $$\eta \approx \left(\frac{\Delta n}{2n}\right)^2, \qquad [2]$$

for small $\Delta n/n$, where $\Delta n$ is the index perturbation and n is the index of refraction of the material. By contrast, the diffraction efficiency for a phase reflection hologram written with plane waves is approximately $$\eta = \tanh^2\left(\frac{\pi d \Delta n}{\lambda}\right) \approx \left(\frac{\pi d \Delta n}{\lambda}\right)^2. \qquad [3]$$

where $\Delta n$ is the index change in the material, d is the hologram depth (thickness), and $\lambda$ is the wavelength of the signal and reference beams.

For a $\Delta n$ of $10^{-3}$ and n=1.5, eq. [2] yields a diffraction efficiency on the order of $10^{-6}$ for an index perturbation storage method. For an identical $\Delta n$ of $10^3$ and values of d Å 25 µm and λ Å 0.5 µm, equation [3] yields a diffraction efficiency on the order of $10^{-1}$ for a holographic storage method of the present invention, five orders of magnitude higher than for an index perturbation method using an identical $\Delta n$.

The microholograms can be stored using amplitude, phase, or combined amplitude-and-phase modulation of reference beam 30a and signal beam 30b. Because of the simplicity of the required components, pure amplitude modulation is preferred. In amplitude modulation, bits are stored as amplitudes of corresponding holograms. Modulation and error-correction codes can be used; various such codes are well known.

In pure phase modulation, data can be stored as relative phases of holograms. FIG. 3-B illustrates schematically holograms 65, 65' having opposite phases. The phase of hologram 65' is offset by π (180°) relative to the phase of hologram 65. During storage, at least one of beams 30a, 30b can be phase delayed to produce a relative phase delay of π between the storage of holograms 65, 65'. During readout, the reconstructed signal beam from each hologram can be compared to a phase reference. The signal detected by detector 58a then depends on the phase difference between the phase reference and the signal beam from the stored hologram. For example, a phase reference can interfere constructively with the signal reflected from one of holograms 65, 65', and destructively with the signal reflected from the other.

Parallel readout can be accomplished by using a light source comprising a plurality of mutually incoherent lasers aligned in close proximity. The lasers generate spatially separated, mutually incoherent reference beams. The reference beams are imaged onto a radial line such that each reference beam is focused on one of a number of adjacent tracks within the medium. A detector comprising multiple independent aligned detecting elements is then used for data retrieval. Each of the reconstructed output beams is incident on one of the detecting elements. Since the reference beams are mutually incoherent, they do not interfere even if their corresponding tracks are closely spaced.

Figure 4:
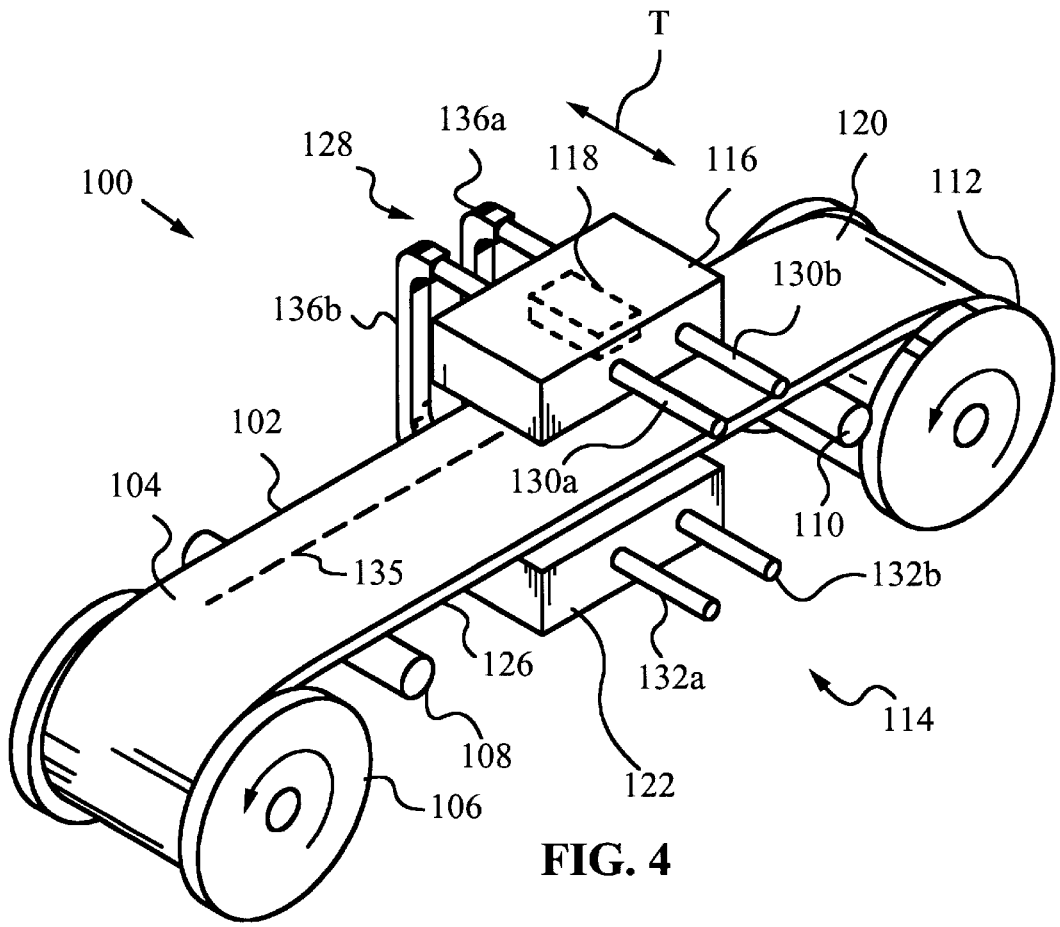
FIG. 4 shows an isometric view of an alternative storage system of the present invention.

In general, various head assemblies may be used in a system and method of the present invention. FIG. 4 shows a holographic storage system 100 in which a holographic tape 102 comprising a holographic medium 104 is mounted on a set of four rollers 106, 108, 110 and 112 which make up a tape driver system 114. A first positioning actuator 116 carrying a tunable-focus reference head 118 is positioned over a top surface 120 of tape 102. A second positioning actuator 122 carrying a tunable-focus signal head 124 (not visible in the view of FIG. 4) is positioned above a bottom surface 126 of tape 102.

Both positioning actuators 116, 122 are mounted on an guiding mechanism 128. Mechanism 128 has two sets of parallel rails 130a, 130b and 132a, 132b on which positioning actuators 116, 122 can move along the direction indicated by arrow T. This direction is generally transverse with respect to tape 102. The position of positioning actuators 116, 122 along rails 130a, 130b and 132a, 132b is adjusted as necessary to access individual data tracks 135. Mechanism 128 may have two joining rails 136a, 136b for the sets of parallel rails 130a, 130b and 132a, 132b.

Rolls 108 and 110 serve to ensure that tape 102 is maintained planar to a high degree of precision between positioning actuators 116 and 122. Under this condition positioning actuators 116, 122 can be placed closer to tape 102 for better performance.

It will be clear to one skilled in the art that the above embodiments may be altered in many ways without departing from the scope of the invention. For example, the distinction between the reference and signal beams during storage is a formal one, since information is encoded in the amplitude and/or phase of the beams rather than necessarily in the wave structure (cross-sectional pattern) of the signal beam. The signal and reference beams are essentially equivalent during storage, and any of the two beams may be used for retrieval. Multiple discrete amplitude/phase levels for the microholograms may be used for digital gray scale storage. Continuous levels may be used for analog storage.

The holograms need not be uniforms round spots. As the tape continuously moves, a continuous hologram can be written, and the intensity of the writing beam can be varied in time to store information as micro-localized variations in the hologram according to a suitable modulation code. Such storage and readout in a moving medium would be facilitated by the planar orientation of the hologram fringes, in the plane of the tape. Various modulation codes which relate stored information to a complex-valued temporal waveform (i.e. an amplitude and/or phase function) characterizing a reflection hologram can be used.

The storage material can be in general any suitable linear or non-linear photosensitive material. The storage medium material need not be a photopolymer. For example, various storage materials known in the art can be suitable for the present invention, including photopolymers, photosensitive glasses, and photorefractive materials. A non-linear medium such as a two-photon medium can be used, in which light incident on the medium at one wavelength sensitizes the medium for recording at another wavelength. The use of a non-linear storage material may reduce scheduling losses that occur in linear media.

It will be apparent from the foregoing that, while particular forms of the invention have been illustrated and described, various modifications can be made without departing from the spirit and scope of the invention. Accordingly, it is not intended that the invention be limited, except as determined by the following claims and their legal equivalents.

What is claimed is:

1. A holographic digital data storage system comprising:
   a) a holographic storage tape having a top surface and a bottom surface;
   b) a light source for generating a signal beam and a reference beam;
   c) a first positioning actuator positioned over said top surface and carrying a tunable-focus reference head, said tunable-focus reference head being in optical communication with said light source for guiding and focusing said reference beam at storage locations at a plurality of depths within said holographic storage tape;
   d) a second positioning actuator positioned over said bottom surface and substantially opposite said first positioning actuator, said second positioning actuator carrying a tunable-focus signal head, said tunable-focus signal head being in optical communication with said light source for guiding and focusing said signal beam coincidentally with said reference beam in a substantially counterpropagating geometry at said storage locations to store digital data as reflection microholograms at said storage locations.

2. The holographic digital data storage system of claim 1 further comprising a means for maintaining said holographic storage tape planar between said tunable-focus reference head and said tunable focus signal head.

3. The holographic digital data storage system of claim 1 wherein said first positioning actuator and said second positioning actuator are mounted on a guiding mechanism.

4. The holographic digital data storage system of claim 1 wherein said holographic storage tape has a thickness sufficient for storing a stack of least five of said reflection microholograms.

5. A holographic digital data retrieval system comprising:
   a) a holographic storage tape having a top surface;
   b) a light source for generating a reference beam;
   c) a first positioning actuator positioned over said top surface and carrying a tunable-focus retrieval head, said tunable-focus retrieval head being in optical communication with said light source for guiding and focusing said reference beam on reflection microholograms at a plurality of depths within said holographic storage tape and for capturing a signal beam reflected by said reflection microholograms; and
   d) an optical detector in optical communication with said retrieval head, for detecting said signal beam to retrieve digital data stored as said reflection microholograms.

6. The holographic digital data retrieval system of claim 5 further comprising a means for maintaining said holographic storage tape planar between said tunable-focus reference head and said tunable focus signal head.

7. The holographic digital data retrieval system of claim 5 wherein said first positioning actuator is mounted on a guiding mechanism.

* * * * *